TEMPERATURE COMPENSATING INDUCTOR AND CIRCUIT

Filed Jan. 4, 1968 2 Sheets-Sheet 1

INVENTORS D. W. GRANT
R. M. LEAFER
BY Leo Stanger
ATTORNEY

Oct. 7, 1969 D. W. GRANT ET AL 3,471,815

TEMPERATURE COMPENSATING INDUCTOR AND CIRCUIT

Filed Jan. 4, 1968 2 Sheets-Sheet

3,471,815
TEMPERATURE COMPENSATING INDUCTOR AND CIRCUIT

Dwight W. Grant, Carr Township, Clark County, Ind., and Robert M. Leafer, West Peabody, Mass., assignors to Bell Telephone Laboratories, Incorporated, Murray Hill, N.J., a corporation of New York
Filed Jan. 4, 1968, Ser. No. 695,595
Int. Cl. H01f 15/02
U.S. Cl. 336—83 18 Claims

ABSTRACT OF THE DISCLOSURE

An inductor's performance variations due to changes in temperature are controlled by threading two ferrite slugs into a sleeve at positions on opposite sides of a gap in the inductor core. The threads on the sleeve for each slug oppose each other. Aligned keyways in the slugs permit a key to rotate both slugs simultaneously as well as individually. The simultaneous rotation moves the slugs in opposite directions. Individual movement of one slugs adjusts the temperature-inductance characteristic of the inductor while simultaneous movement of the slugs adjusts the inductance.

GENERAL FIELD OF THE INVENTION

This invention relates to temperature-compensating inductive devices such as inductors and tuned transformers, and particularly to methods and means for adjusting the response of inductive devices, as well as circuits using inductive devices, to changes in temperature.

DESCRIPTION OF THE PRIOR ART

Inductive devices, or components used with inductive devices in electrical circuits, often respond to changes in temperature by varying their characteristics. Thus, a resonant circuit composed of an inductor and capacitor may detune in response to changes in ambient temperatures or in the temperature of the equipment housing the components. In some cases this detuning is desirable. However, this is so only when the detuning follows a predetermined pattern of change.

In the past, it has been customary to avoid the effects of such performance changes by the use of supplementary trimming devices which respond to temperature changes by changing their characteristics opposite to the change in the characteristics of the main components. Alternatively, the use of temperature-independent materials has been attempted. As a third possibility the components or the parts of individual components have been matched so that the rise in temperature of one component has an effect compensating the effect to be offset. In these cases, the compensation has been effective only within broad tolerances. Narrower tolerances involved great expense or were extremely difficult to obtain.

U.S. Patent 2,437,345 attempts to alleviate the effects of temperature variation upon an inductor by using two tuning slugs having different coefficients of thermal expansion. The frame holding the coils and the shaft holding the slugs within the coils, have coefficients of expansion such as to prevent the slugs from moving relative to the coil in response to changes in temperature. Such construction requires critically selected materials for critically placed parts and is quite expensive. It limits the freedom with which such an inductor may be adjusted to produce predetermined changes in inductance in response to temperature.

SUMMARY OF THE INVENTION

According to the invention the disadvantages of prior inductive devices and circuits using them are obviated by mounting two movable tuning slugs in a support or track preferably at such positions along a track in the magnetic circuit of an inductive device where temperature-caused dimensional changes move the slugs in unison to achieve opposing overall inductance changes, and engaging the track and the slugs so that the same adjusting movement simultaneously forces the slugs to move in the same direction relative to their effectiveness in the magnetic circuit, thereby allowing adjustment of the inductance of the device, while at the same time permitting individual adjustment of the slugs. Preferably the magnetic circuit includes a core with a gap between the slugs. The track is made of a material having a different thermal coefficient of expansion than the core material near the gap.

Permitting individual adjustment of the slugs allows them to be placed at positions in the magnetic circuit, such as relative to the gap so that the track's temperature expansion or contraction moves them in unison, one slug's temperature-induced movement affects the overall inductance change more than the other. A craftsman can thus also move the slugs individually to vary the differences in the effects of the slugs upon temperature-caused overall inductance changes. This permits control of the temperature-inductance characteristic of the inductive device or the temperature frequency characteristic of a tuned circuit using the device. On the other hand, simultaneously moving such individually-adjusted slugs so the joint effect of their movement is cumulative, allows the inductance to be changed without substantial variation in the previously set temperature-inductance characteristic of the inductive device. According to a feature of the invention the individually-adjusted slugs are moved simultaneously apart and together.

According to another feature of the invention the track comprises a plastic sleeve inside an inductive device formed in part of so-called cup cores. The slugs are mounted by means of thread within the sleeve. The sleeve threads for one core being opposite to that to the threads for the other core.

According to another feature of the invention the slugs have centrally located keyways. When a key simultaneously rotates the slugs they move simultaneously towards or simultaneously away from the center of the sleeve which is located near the gap.

These and other features of the invention are pointed out in the claims. Other advantages and objects of the invention will become known from the following detailed description when read in light of the accompanying drawings:

DESCRIPTION OF PREFERRED EMBODIMENTS

Figure 1:
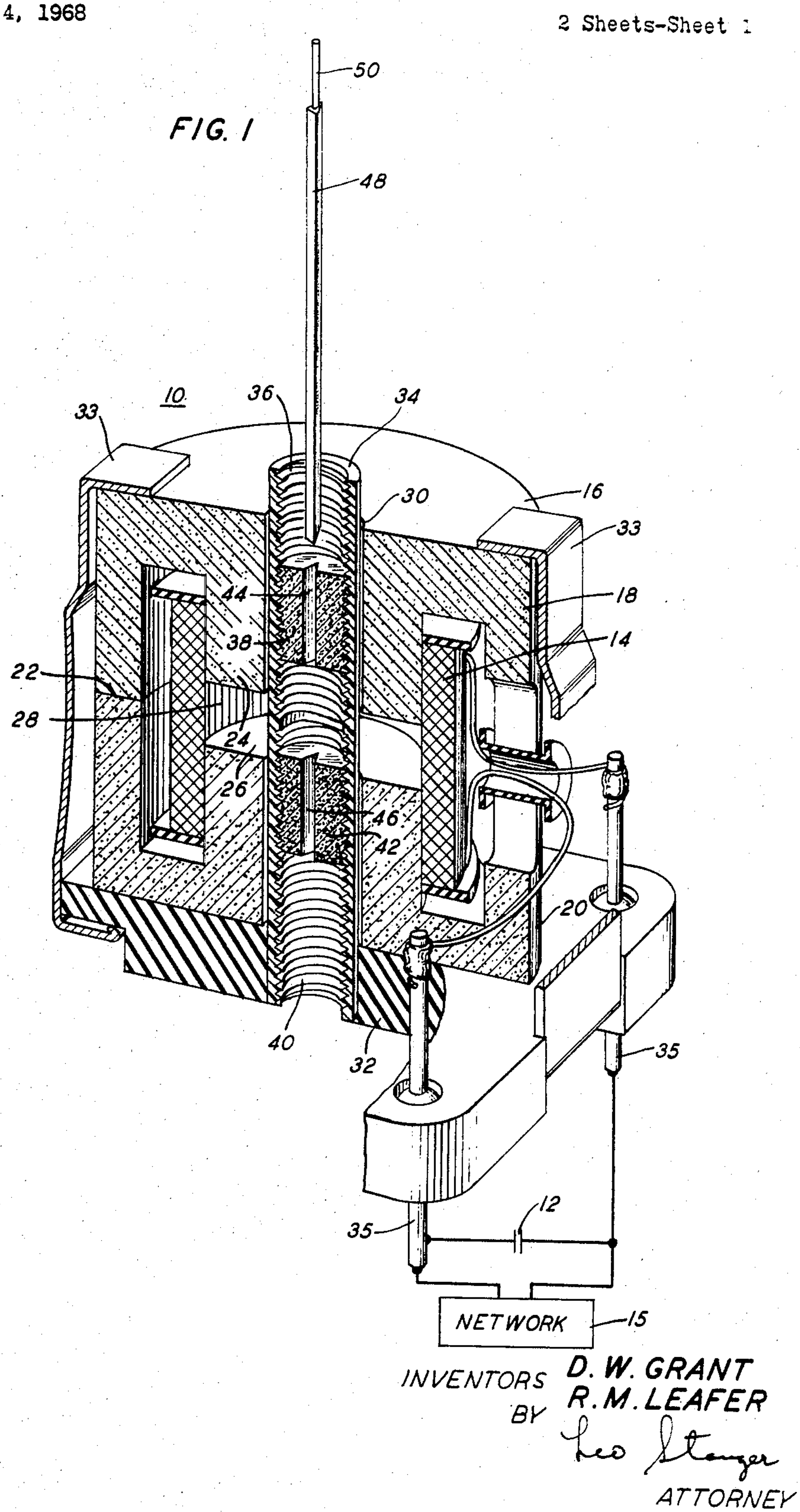
FIG. 1 is a partly pictorial, partly schematic representation, with an inductor shown mainly pictorially, of a circuit embodying features of the invention.

In the circuit of FIG. 1 an inductor 10 tunes a capacitor 12 by means of a connection to a winding 14 in the inductor. The circuit composed of inductor 10 and capacitor 12 is part of a larger network 15. A core 16 composed of two cup cores 18 and 20 held together at a line 22 form a hollow cylinder that encapsulates the winding 14. Two opposing chimney-like structures 24 and 26 constituting integral members of the cup cores 18 and 20 form a gap 28 between them and also form a central bore 30 coaxial with the core 16. A mounting plate 32 of insulating material supports the core 18 which is preferably made of a magnetic ferrite or other suitable core material. A spring clip 33 holds the cup cores 18, 20 and the plate 32 together. The cup cores 18, 20 and the plate 32 may also or alternatively be cemented together.

The plastic sleeve 34 secured at its base to a hole in the plate 32 extends through the bore 30 with a small clearance fit. For purposes of illustration in FIG. 1 the fit between the board 30 and the sleeve 34 is shown to be looser than actual. This is done to illustrate the mobility of the sleeve 34 relative to the core 16 in response to heat expansion. A pair of pins 35 extending from the plate 32 serve as connectors from the winding 14 to the capacitor 12.

Threads 36 in the sleeve 34 carry a slug 38 whose threads engage the threads 36 inside the sleeve. Threads 40 on the other end of the sleeve opposing the threads 36 and meeting the threads 36 in the vicinity of the gap 28 support an externally threaded slug 42. The slugs 38 and 42 are preferably made of the same material as the core 16.

The slugs 38 and 42 are keyed by respective keyways 44 and 46 that engage a triangular key 48 at the end of a tuning stick 50. The key 48 is sufficiently long so that if properly positioned can engage both of the slugs in any of their positions within the sleeve 34 and turn the slugs simultaneously. The tuning stick 50 is sufficiently thin beyond the key 48 so that the key 48 can be passed entirely through one of the slugs such as the slug 38 and rest only in the keyway 46 of the slug 42 and turn only the slug 42.

In the circuit of FIG. 1 the capacitor 12 may exhibit either a constant capacitance or capacitance changes in response to changes in temperature. The inductor 10 of FIG. 1 is adjusted to match these capacitance characteristics so as to obtain tuning that follows a predetermined characteristic relative to the temperature, such as a constant tuning with no change or along a predetermined frequency path, by adjusting the slugs 38 and 42. This adjustment may be accomplished in two ways.

In one way, the inductor 10 is disconnected from the circuit of FIG. 1 and the inductor adjusted alone. First the tuning stick adjusts the position of each one of the slugs 42 relative to the gap. For example, the slug 42 may be adjusted closer to the gap 28 than the slug 38. Then, the sleeve 34, because it expands faster than the core 16 in response to elevation of temperature, carries the slug 38 axially away from the gap and the slug 42 toward the gap. Because the slug 42 is so much closer to the gap, it increases the inductance more than the slug 38 decreases it. This is so even though the slug 38 may be carried away from the gap faster than the slug 42 is carried toward it. Thus, any change that rising temperature may impart to the inductor 10 is added to or offset by an increase in the inductance of the inductor 10. The relationship of the slugs 38 and 42 to the gap 28 may be made sufficient to achieve many desired increases of inductance with changes in temperature. That is it may be adjusted to achieve a large number of temperature-inductance slopes.

On the other hand, where the slug 42 is placed further from the gap 28 than the slug 38, axial movement of the slug 38 has a greater effect on inductance than movement in the same direction by the slug 42. Also, an elevation in temperature removes the slug 38 out of the gap faster than the rise of the slug 42 toward the gap. This, of course, occurs because the sleeve 34 elongates faster in response to increasing temperature than the core 16. Thus, any desired decrease in inductance can be achieved in response to increase in temperature.

In either case the average inductance, or the inductance of the inductor at any one temperature, may then be achieved by passing the key 48 into both keyways 44 and 46 of the slugs 38 and 42 and turning in one or the other direction until the desired inductance is achieved. This turning of the tuning stick 50 in one direction moves both slugs toward the gap and thereby increases the inductance without changing the relative location of the slugs 38 and 42 with respect to the gap 28. Turning the tuning stick 50 in the other direction simultaneously turns the slugs in the same direction, and because of the opposing threads 36 and 40, moves the slugs away from the gap 28 without changing the relative positions with respect to the gap 28.

If necessary, for extremely fine adjustment, the slugs may again be individually tuned to achieve the desired temperature inductance slope, that is change in inductance with respect to change in temperature. After that, the final inductance may again be achieved with even greater accuracy by turning the slugs simultaneously in one or the other direction with the tuning stick 50 having its key 48 simultaneously in both keyways 44 and 46.

The thus-adjusted inductor can then be connected to the capacitor to achieve the desired tuning variation with respect to temperature. A most common example of this would be to achieve a temperature inductance slope opposite to that of the capacitance temperature slope of the capacitor 12 and thereby achieve a constant resonant frequency for a range of temperatures.

The second manner in which the circuit of FIG. 1 may be tuned is to apply test signals and measure the resonant frequency of the circuit. At the same time changing the temperature of the capacitor and inductor simultaneously allows adjustment of the individual slugs 42 and 38 until a desired flat, or otherwise predetermined, temperature-frequency response is achieved. The slugs 38 and 42 are then turned simultaneously in the same direction by placing the end or key 48 in the keyways 44 and 46 and turning the tuning stick 50 until the desired frequency is achieved. Fine adjustment of the temperature-frequency slope is then made by adjusting one or the other slugs near the tuning frequency and then finally tuning to the correct resonant frequency by turing both of the slugs simultaneously in the same direction. Each time the slugs are rotated in the same direction, one moves axially away from the gap or toward the gap and the other moves in the opposite direction away from or toward the gap.

The invention permits an effective separation of the adjustments necessary for achieving a desired tuning frequency or inductance on the one hand and a desired temperature-frequency or temperature-inductance slope on the other. The invention permits very fine adjustments in temperature-inductance slopes.

Figure 2:
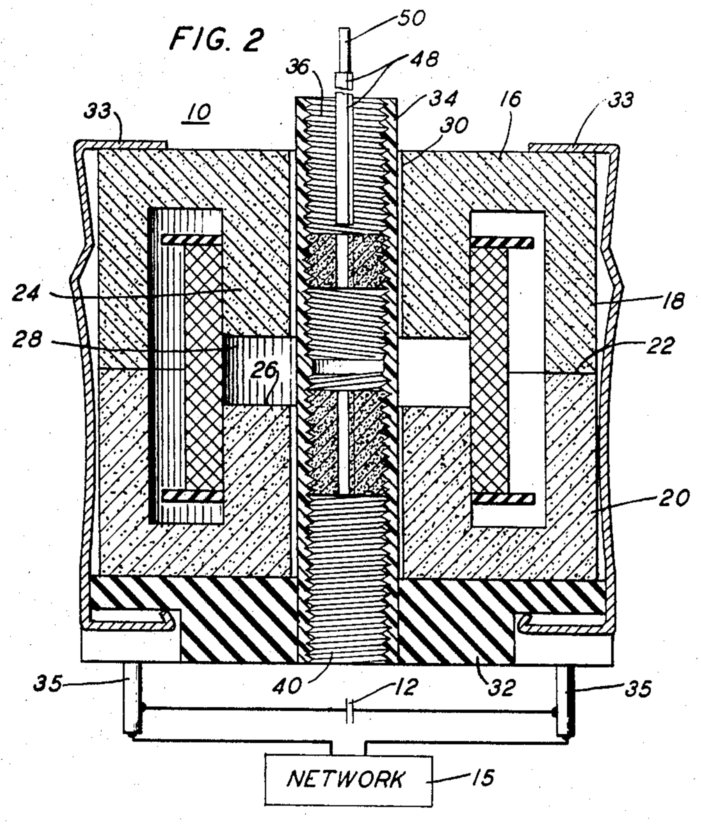
FIGS. 2 and 3 are partly pictorial, partly schematic diagrams of circuits also embodying features of the invention.
Figure 3:
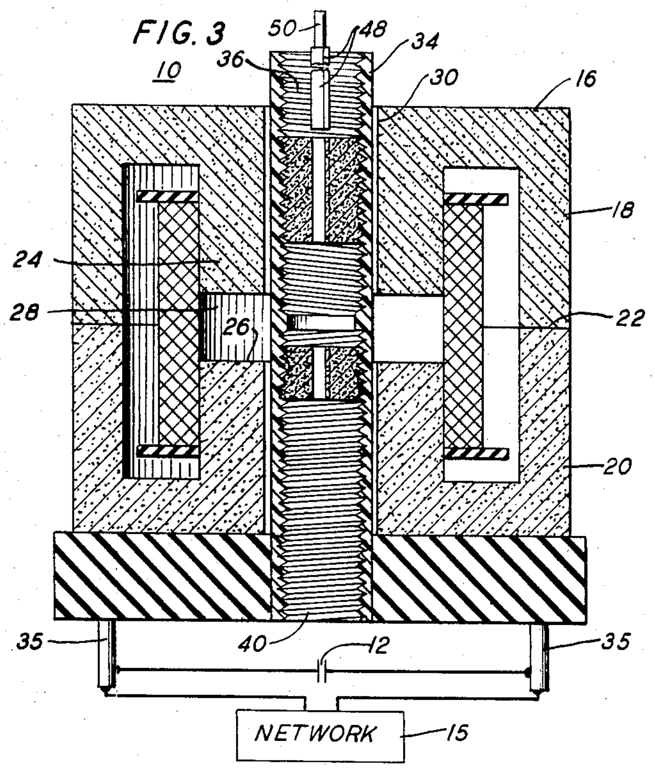

The slopes obtained by positioning the individual slugs can be maintained even more consistenely, during the inductance adjustment when both slugs are moved simultaneously, by making the slugs different sizes as shown in FIGS. 2 and 3. In FIG. 2 the lower slug is larger than the upper slug. In FIG. 3 the upper slug 38 is larger than the lower slug 42. FIG. 3 is shown without the spring clip 32. The cup cores 16 and 18 and the plate 32 are here cemented together.

The inductor 10 may be manufactured by encapsulating the winding 14 between the parts 18 and 20. At the same time the sleeve 34 is cemented to the plate 32, which has had the pins 35 molded thereon. The core 16 is then secured to the plate 32 by sliding it over the sleeve 34. The spring clip 33 is applied to hold the cup cores 18 and 20 together and to the plate 32. The inductor assembly is completed by threading the cores 38 and 42 into the sleeve 34 and connecting the pins 32 to the winding 14. The cup cores 18 and 20 and the plate 32 may also be cemented together instead of held by the spring clip 33.

The invention also contemplates making the sleeve 34 of a material having a coefficient of expansion such as to expand more slowly than the core 16 in response to elevations in temperature. In that case adjustment of the slug positions is opposite to that described for achieving a particular inductance-temperature characteristic slope.

According to one example of the invention an inductor such as shown in FIG. 2 has the following characteristics core material—Mn-Zn, list 1—ferrite
core diameter—.960"
core height—.700"
interior diameters—.780"
chimney diameters—.465"
opening—.300"
gap length—.09"
sleeve material—"Celcon" plastic
sleeve diameter—.292"
slug diameters—.188"
upper slug length—.156"
lower slug length—.312"

The inductor 10 represents an exemplary inductive device in FIGS. 1, 2 and 3. The device shown in FIGS. 1, 2 and 3 and described as an inductor 10, may also constitute other inductive devices. For example, the member 10 may constitute a tuned transformer. In that case, what is shown as winding 14 constitutes two or more windings, and two or more extra pins such as 35 on unshown cutaway portion of FIGS. 1, 2 and 3 connect the extra winding to the network 15.

While embodiments of the invention have been described in detail, it will be obvious to those skilled in the art that the invention may be embodied otherwise without departing from its spirit and scope.

What is claimed is:

1. An inductive device comprising winding means, a magnetic path inductively linked with said winding means, a pair of magnetic slug means, temperature-expansible support means for holding said magnetic slug means in the vicinity of said path, said slug means being movable relative to said support means into positions where they each vary in effectiveness in confining magnetic lines from said winding means, said slug means being engageable for being singly actuated and for being simultaneously actuated by forces applied in the same direction, and adjustment means forming a part of said support means for constraining both of said slug means to move together into more effective positions and together into less effective positions when said slug means are simultaneously actuated by forces applied in the same direction, said adjustment means further constraining said slug means to move alone when said slug means are actuated alone said support means holding said slug means so that temperature-caused changes in the support means move said slug means in unison to achieve opposing inductive effects.

2. An inductive device as in claim 1 wherein said magnetic path includes magnetic core means forming a gap therein.

3. A device as in claim 2 wherein said slug means are positioned in the vicinity of said gap.

4. A device as in claim 17 wherein said support means hold said slug means so that temperature-caused changes in the support means move said slug means in unison to achieve opposing inductive effects.

5. A device as in claim 3 wherein said adjustment means include track means for producing opposed translatory motion of said slug means in response to rotary motion of said slug means in the same direction.

6. A device as in claim 3 wherein said support means include a sleeve and wherein said slug means comprise cylindrical slugs mounted within said sleeve.

7. A device as in claim 6 wherein said sleeve includes threads on the interior face thereof, wherein said slugs have threads on their exterior faces in engagement with the threads on said sleeve, the threads on said high sleeve engaging one of said slugs opposed in direction to the threads on said sleeve engaging the threads on the other of said slugs, whereby rotary motion of the slugs in the same direction moves said slugs in opposing directions relative to said gap so as to adjust the inductance of the inductor.

8. A device as in claim 7 wherein said slugs each include identical central keyways in alignment with each other so a single keyway may turn both slugs in one direction simultaneously.

9. A device as in claim 7 wherein said core means form a hollow cylinder with interiorly-extending opposing coaxial stems separated from each other by said gap, and wherein said stems form a coaxial opening, said support sleeve passing through said opening, and means for supporting said sleeve relative to said core means.

10. A device as in claim 9 wherein holding means support said sleeve at one end of said core means away from said gap.

11. A device as in claim 10 wherein said slug closer to said holding means is larger than said slug away from said holding means.

12. A device as in claim 10 wherein said slug closer to said holding means is smaller than the slug away from said holding means.

13. A device as in claim 10 wherein said slugs are of equal size.

14. A circuit comprising a circuit element, said element changing its characteristics in one direction in response to changes of temperature in one direction, winding means connected to said element, a magnetic path inductively linked with said winding means, a pair of magnetic slug means, support means for holding said magnetic slug means in the vicinity of said path and being made of material having a temperature coefficient of expansion different than that of the material in said magnetic path, said slug means being movable relative to said support means into positions where they are each more and less effective in confining magnetic lines from said winding means, both of said slug means being positioned so that expansion of said support means moves said slug means in unison to achieve opposing inductance changes, said slug means being engageable for being singly actuated and for being simultaneously actuated by forces applied in one of two directions, and adjustment means forming a part of said support means for constraining both of said slug means to move together into more effective positions and together into less effective positions when said slug means are simultaneously actuated by forces applied in the same one of the two directions, said adjustment means further constraining said slug means to move alone when said slug means are actuated alone, whereby the characteristics of the circuit may be changed without affecting the relative response of the circuit to changes in temperature, said support means holding said slug means so said temperature-caused changes in the support means move one of said slug means into a more effective and the other of said slug means into a less effective position thereby achieving opposing inductive effects.

15. The method of manufacturing an inductive device which comprises assembling a winding and a core having a gap in such a way that they will be inductively linked in response to currents passing through the winding, mounting a track that is heat expansible at a different rate than the core upon the core so that it extends past said gap, movably mounting a pair of slugs in said track on opposite sides of said gap, adjusting said slugs so as to achieve a predetermined change in inductance in response to changes in temperature, and moving said slugs simultaneously in opposite directions so as to adjust the inductance of said inductor at any one temperature.

16. The method of forming an inductor which comprises encapsulating an electrical winding in a core having a central gap, mounting an elongated sleeve having oppositely going internal threads at opposite ends thereof so that the sleeve extends past said gap, screwing a pair of slugs in opposite ends of said sleeve until a predetermined change in inductance is achieved relative to a change in temperature, simultaneously turning said slugs in the same direction by means of a single key passing through both slugs to adjust the inductance of said inductor at said one temperature.

17. An assembly comprising winding means, a magnetic path inductively linked with said winding means, a pair of magnetic slug means, support means for holding said magnetic slug means in the vicinity of said path, said slug means being movable relative to said support means into positions where they are each more and less effective in confining magnetic lines from said winding means, said slug means being engageable for being singly actuated and for being simultaneously actuated by a single applied force, and adjustment means forming a part of said support means for constraining both of said slug means to move into more effective positions and both of said slug means to move into less effective positions when said slug means are both simultaneously actuated by a single force in one direction and then the other direction, said adjustment means further constraining said slug means to move alone when said slug means are actuated alone, and actuating means engaging both of said slug means for applying a single force to both of said slug means, said support means having a different temperature coefficient of expansion than the material in said magnetic path.

18. An assembly as in claim 17 wherein said magnetic path includes magnetic core means forming a gap therein, wherein said slug means are positioned in the vicinity of said gap, wherein said support means include a sleeve and wherein said slug means comprise cylindrical slugs mounted within said sleeve, wherein said sleeve includes threads on the interior face thereof, wherein said slugs have threads on their exterior faces in engagement with the threads on said sleeve, the threads on said high sleeve engaging one of said slugs being opposed in direction to the threads on said sleeve engaging the threads on the other of said slugs, whereby rotary motion of the slugs in the same direction moves said slugs in opposing directions relative to said gap so as to adjust the inductance of the inductor, wherein said slugs each include identical central keyways in alignment with each other so a single key may turn both slugs simultaneously, and wherein said actuating means include a key long enough to enter the keyways of both slugs.

References Cited

UNITED STATES PATENTS 2,837,726 6/1958 Pearlman et al.

FOREIGN PATENTS 214,499 3/1957 Australia.
479,880 1938 Great Britain.

LEWIS H. MYERS, Primary Examiner

T. J. KOZMA, Assistant Examiner

U.S. Cl. X.R.

29—602, 606; 336—132, 136, 179